(12) United States Patent
Cucerzan

(10) Patent No.: US 8,321,471 B2
(45) Date of Patent: Nov. 27, 2012

(54) ERROR MODEL FORMATION

(75) Inventor: Silviu P. Cucerzan, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1692 days.

(21) Appl. No.: 11/094,078

(22) Filed: Mar. 30, 2005

(65) Prior Publication Data

US 2005/0210017 A1    Sep. 22, 2005

Related U.S. Application Data

(63) Continuation-in-part of application No. 10/801,968, filed on Mar. 16, 2004, now Pat. No. 7,254,774.

(51) Int. Cl.
*G06F 7/00* (2006.01)
*G06F 17/30* (2006.01)

(52) U.S. Cl. ........................... 707/803; 715/257

(58) Field of Classification Search .................. None
See application file for complete search history.

(56) References Cited

U.S. PATENT DOCUMENTS

| | | | |
|---|---|---|---|
| 5,258,909 A | 11/1993 | Damerau et al. | |
| 5,659,771 A | 8/1997 | Golding | |
| 5,715,469 A | 2/1998 | Arning | |
| 5,754,939 A | 5/1998 | Herz et al. | |
| 5,875,443 A | 2/1999 | Nielsen | |
| 5,892,919 A | 4/1999 | Nielsen | |
| 6,047,300 A | 4/2000 | Walfish et al. | |
| 6,081,774 A | 6/2000 | de Hita et al. | |
| 6,272,456 B1 | 8/2001 | de Campos | |
| 6,616,704 B1 | 9/2003 | Birman et al. | |
| 6,636,849 B1 | 10/2003 | Tang et al. | |
| 6,684,201 B1 | 1/2004 | Brill | |
| 6,701,309 B1 * | 3/2004 | Beeferman et al. | 707/3 |
| 6,785,677 B1 * | 8/2004 | Fritchman | 707/6 |
| 6,853,993 B2 | 2/2005 | Ortega et al. | |
| 6,918,086 B2 | 7/2005 | Rogson | |
| 7,076,731 B2 | 7/2006 | Brill et al. | |
| 7,194,684 B1 * | 3/2007 | Shazeer | 715/533 |
| 7,254,774 B2 | 8/2007 | Cucerzan et al. | |

(Continued)

FOREIGN PATENT DOCUMENTS

JP    2005267638    9/2005

(Continued)

OTHER PUBLICATIONS

U.S. Appl. No. 10/801,968, filed Mar. 16, 2004.

(Continued)

*Primary Examiner* — Aleksandr Kerzhner
*Assistant Examiner* — Joshua Bullock
(74) *Attorney, Agent, or Firm* — Joseph R. Kelly; Westman, Champlin & Kelly, P.A.

(57) ABSTRACT

In a method of forming a target error model to facilitate correcting or suggesting corrections to misspelled input text related to a target data collection, a source query log containing user queries to at least one source data collection is provided. Next, target relational data is generated based on the source query log including corrective substring suggestions that relate to the target data collection and corresponding misspelled substrings extracted from the source query log. A target error model is then built using the target relational data. The target error model includes target statistical occurrence data for the substrings of the target relational data derived from the source query log. Finally, the target error model is stored on a computer readable medium. Additional embodiments of the invention are directed to a system configured to implement the method.

18 Claims, 6 Drawing Sheets

U.S. PATENT DOCUMENTS

| | | | |
|---|---|---|---|
| 2002/0152204 | A1 | 10/2002 | Ortega |
| 2002/0169596 | A1 | 11/2002 | Brill et al. .......................... 704/9 |
| 2003/0033288 | A1* | 2/2003 | Shanahan et al. ................. 707/3 |
| 2003/0037077 | A1* | 2/2003 | Brill et al. ..................... 707/533 |
| 2004/0002994 | A1* | 1/2004 | Brill et al. .................. 707/104.1 |
| 2004/0024584 | A1 | 2/2004 | Brill .................................. 704/9 |
| 2004/0073333 | A1 | 4/2004 | Brill ............................. 700/224 |
| 2004/0093567 | A1* | 5/2004 | Schabes et al. ............... 715/533 |
| 2004/0254917 | A1 | 12/2004 | Brill et al. ......................... 707/3 |
| 2004/0254920 | A1 | 12/2004 | Brill et al. ......................... 707/3 |
| 2006/0004744 | A1* | 1/2006 | Nevidomski et al. ............. 707/4 |
| 2006/0112091 | A1* | 5/2006 | Chapman et al. ................. 707/4 |
| 2011/1035370 | | 2/2011 | Ortega et al. |

FOREIGN PATENT DOCUMENTS

WO          0004465          1/2000

OTHER PUBLICATIONS

"Spelling correction as an iterative process that exploits the collective knowledge of web users," Silviu Cucerzan and Eric Brill, Proceedings of EMNLP 2004, Barcelona 2004.

European Patent Application No. 01 101 951.1-1527 Office Action dated Nov. 21, 2007, 5 pages.

Chinese Patent Application No. 200510059231.0 First Office Action dated Jul. 20, 2007.

Chinese Patent Application No. 200510059231.0 Second Office Action dated Jan. 4, 2008.

Japanese Patent Application No. 2005-074980 Office Action dated Dec. 22, 2009. 1 page. (no translation).

Srihari, et al., "Integrating Diverse Knowledge Sources in Text Recognition", ACM, vol. 1, Jan. 1983, pp. 68-75.

Ruch, Information Retrieval and Spelling Correction: an Inquiry into Lexical Disambiguation. Proceedings of the 2002 ACM Symposium on Applied Computing, pp. 699-703, 2002.

Brill, An Improved Error Model for Noisy Channel Spelling Correction. In Proc. of the 2000 Association for Computational Linguistics Conference, 2000, 8 pages.

Mangu, et al. Automatic Rule Acquisition for Spelling Correction. In Proc. 14th International Conference on Machine Learning, 1997, 8 pages.

Mays, et al. Context Based Spelling Correction, Information Processing and Management, vol. 27, No. 5, pp. 517-522, 1991.

Damerau, A Technique for Computer Detection and Correction of Spelling Errors, Information Retrieval, Communications of the ACM, vol. 7, No. 3, Mar. 1964.

Church, et al. Probability Scoring for Spelling Correction, Statistics and Computing 1, pp. 93-103, 1991.

Hitachi, Derwent, Feb. 16, 2001, 1 page (Abstract).

U.S. Appl. No. 09/681,771, filed Jun. 2, 2001, now US Patent No. 7,076,731.

U.S. Appl. No. 10/801,968, filed Mar. 16, 2004, now US Patent No. 7,254,774.

Wagner et al., "The String to String Correction Problem," In Journal of ACM, 21(1):168-178; 1974.

Cucerzan et al., "Augmented Mixture Models for Lexical Disambiguation," In Proceedings of EMNLP 2002, pp. 33-40; 2002.

Golding et al., "Applying Winnow to Context-Sensitive Spelling Correction," In Proceedings of the 13th International Conference on Machine Learning, pp. 182-190; 1996.

Golding, A.R.; A Bayesian Hybrid Method for Context-Sensitive Spelling Correction; In Proceedings of the Workshop on Very Large Corpora, pp. 39-53; 1995.

Kernighan et al., "A Spelling Correction Program Based on a Noisy Channel Model," In Proceedings of COLING 1990.

Kukich, K, "Techniques for Automatically Correcting Words in Text" In ACM Computing Surveys, 24(4):377-439; 1992.

Levenshtein, V.I., "Binary Codes Capable of Correcting Deletions, Insertions and Reversals," Doklady Akademii Nauk SSSR; 163(4) p. 845-848; 1965.

McIlroy, "Development of a Spelling List", In J-IEEE-TRANS-COMM, 30(1); 91-99; 1982.

Wittgenstein, L., "Philosophical Investigations", Macmillan, New York, third edition; 1968 (Part 1 and Part 2).

U.S. Appl. No. 11/620,171, filed Jan. 5, 2007 Prosecution History including: Application and drawings filed Jan. 5, 2007; Preliminary Amendment filed Jan. 23, 2007; Non Final Rejection mailed Apr. 2, 2010; Terminal Disclaimer filed Aug. 30, 2010; Amendment filed Aug. 30, 2010; Terminal Disclaimer Review decision mailed Sep. 30, 2010; Final Rejection mailed Nov. 12, 2010; Notice of Abandonment mailed Jun. 24, 2011.

* cited by examiner

ERROR MODEL FORMATION

CROSS-REFERENCE TO RELATED APPLICATION

The present invention is a continuation-in-part of U.S. patent application Ser. No. 10/801,968, filed Mar. 16, 2004,, which is hereby incorporated by reference in its entirety.

FIELD OF THE INVENTION

The present invention relates generally to spell checkers, and more particularly to systems and methods for forming a spell checker of input text that is related to a target data collection based on query logs of a source data collection.

BACKGROUND OF THE INVENTION

Interaction with automated programs, systems, and services, has become a routine part of most people's lives— especially with the advent of the Internet. Web surfing or browsing for instance may even be the "new" national pastime for a certain segment of the population. In accordance with such systems, applications such as word processing have helped many become more efficient in their respective jobs or with their personal lives such as typing a letter or e-mail to a friend. Many automated features have been added to these applications such as tools for formatting documents in substantially any desired font, color, shape, or form. One tool that has been appreciated and well received by many users is a spell checking application that is either invoked by a user from the word processor to check all or portions of a respective document and/or invoked to run in the background to check spelling as users are typing. Generally, in order to perform accurate spell checking, a dictionary of "valid strings" may be employed by the spell checking application. If a spell checker encounters a string not in the dictionary, it may hypothesize that the string is a spelling error and attempt to find the "closest" string in the dictionary for the misspelled string. Most spell checkers provide a list of possible matches to the user, whereby if the match is on the list, the user can select the word having the corrected spelling from the list. Other spell checking features may perform automatic corrections—if so configured by the user.

Spell checking for word processing, however, presents only a partial view of potential areas that may be applicable to assist users when entering information into a file or document. For example, with all the potential web sites and services available, users often navigate between sites by explicitly typing in all or portions of the site name or by performing searches on words or phrases that appear in the title and the body of a web page. As many have come to find out, if the site information or the search query is entered incorrectly, the cost in time to re-navigate can become quite high. Language processors employed in search engines or other applications often process user queries and may attempt to distinguish actual user commands from incorrectly entered information. As can be appreciated, however, the type of information that may be entered for a query to a search engine may be quite different in structure or form than typically employed in a word processing application. Thus, tools that check words on a somewhat individual and isolated basis in a word processor application may have little or no utility when applied to information generated from general query data.

For example, browser or other search queries for information present a unique problem for spell checking applications, since the queries often consist of words that may not be found in a standard spell-checking dictionary, such as artist, product, or company names. Another problem is that an in-dictionary word may have been entered incorrectly in place of another intended word (for example, "and processors" instead of "amd processors"). Input queries often relate to current events, new or little-used proper nouns (e.g., new product names, people, institutions, and locations that enter the spotlight on a daily basis), such as "hanging chad" and "Apolo Anton Ohno", for example. Additionally, the phrases used as input queries are often very different from those encountered by word processors. Accordingly, both the form and content of input queries present unique problems that standard spell checkers (i.e., those utilizing a dictionary) are not configured to handle.

One possible approach is to utilize substring matching techniques on a log of what users are typing into a particular location, such as a search engine or language processor. Unfortunately, a problem with this approach is that the query logs will generally also contain a large number of input errors and return substring matches that are not relevant to a user's desired search.

Another approach, uses query logs containing user queries to a data collection to generate a query based spell checker or query error model to facilitate spell checking input queries to the data collection. The disclosed method utilizes statistical occurrence data extracted from search query logs to generate possible alternative spellings for the input search query strings directed to the data collection. The method accounts for substrings that may not be found in a lexicon, but are still acceptable as a search query of interest.

Although such query log based spell checker is a useful tool in reducing input query errors to the data collection, it relies upon a large amount of query log data to suggest alternative, more appropriate, input queries to the data collection. Unfortunately, the required query logs are unavailable prior to the release of a new online service directed to a new data collection. As a result, the new online service would lack the query log based spell checker until sufficient query log data is generated by the users of the service.

Embodiments of the present invention provide solutions to these and other problems, and offer other advantages over the prior art.

SUMMARY OF THE INVENTION

The present invention is directed to systems and methods of forming a target error model to facilitate correcting or suggesting corrections to misspelled substrings of a text input relating to a target data collection, based on a source query log containing input queries to a source data collection. In the method, a source query log containing user queries to at least one source data collection is provided. Next, target relational data is generated based on the source query log including corrective substring suggestions that relate to the target data collection and corresponding misspelled substrings extracted from the source query log. A target error model is then built using target relational data that includes target statistical occurrence data for the substrings of the target relational data. Finally, the target error model is stored on a computer readable medium.

The system of the present invention includes a source query log, a target relational data generator, and a target error model generator. The source query log includes query data including substrings of user queries to at least one source data collection. The target relational data generator includes an output of target relational data including corrective substring suggestions and corresponding misspelled substrings for the corrective substring suggestions extracted from the source query log. The target error model generator includes an output of target statistical occurrence data including at least one of unigram statistics and bigram statistics for the substrings of the target relational data. The target statistical occurrence data forms a component of the target error model.

Other features and benefits that characterize embodiments of the present invention will be apparent upon reading the following detailed description and review of the associated drawings.

DETAILED DESCRIPTION OF ILLUSTRATIVE EMBODIMENTS

The present invention generally relates to systems and methods of forming a target error model to facilitate domain-based spell checking or editing including suggesting corrections of input text relating to a target data collection. The input text can include that of a document that relates to the target data collection, an input query to the target data collection, or other input text relating to the target data collection. The target error model is generally formed using source query logs containing input queries to more general source data collections, such as the web, which are not directly related to the target data collection. As will be explained in detail below, the formation (i.e., building or generation) of such an error model, in accordance with embodiments of the invention, is accomplished without reliance on a query log for the target data collection.

Figure 1:
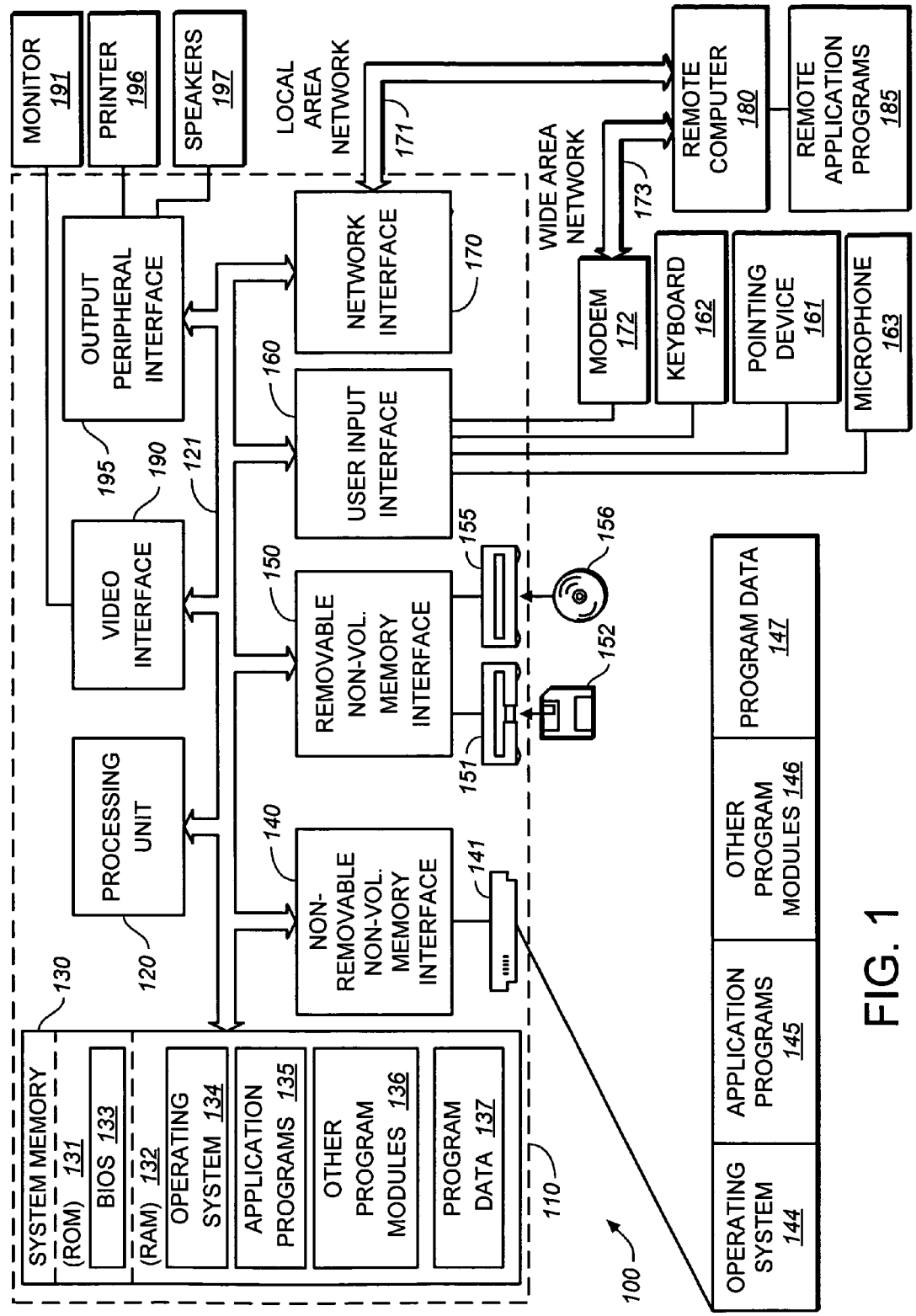
FIG. 1 is a block diagram of one illustrative computing environment in which the present invention can be implemented.

Before describing the present invention in greater detail, a discussion of exemplary computing environments in which the present invention can be used will be provided.
Exemplary Computing Environment FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

Data Collection Search System

Figure 2:
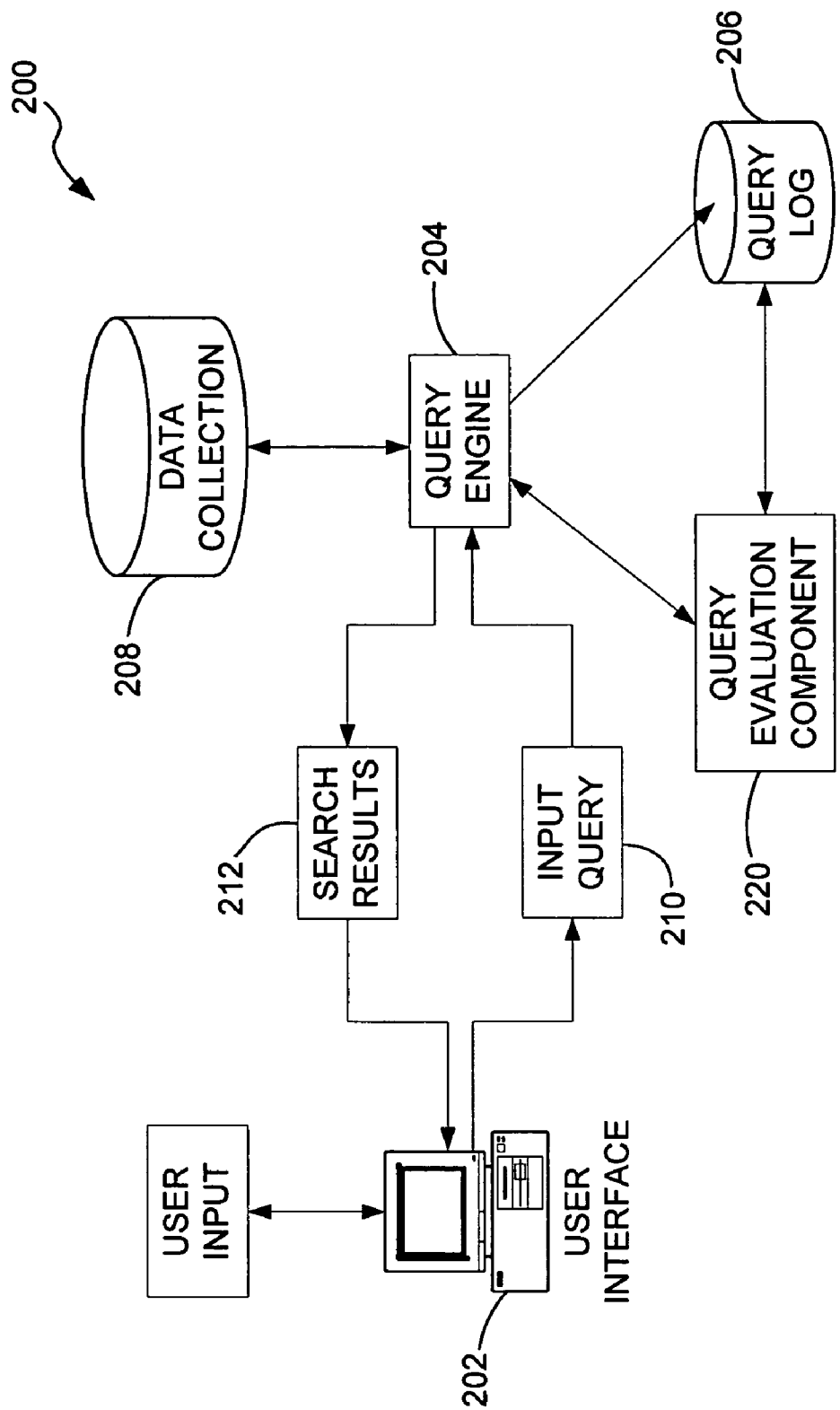
FIG. 2 is a block diagram of a data collection search system relating to embodiments of the invention.

FIG. 2 is block diagram of an exemplary data collection search system, with which the present invention may be used. The system generally includes a user interface 202 (e.g., a web browser) that can be employed by a user to initiate a search query, a query engine 204, a query log 206 and a data collection 208. The user in interface 202 can be a graphical user interface (GUI), a command line interface, or any other suitable interface.

After the user enters an input query into the user interface 202, the input query 210 can be conveyed to the query engine 204, via a mouse click, for example. The query engine 204 can store a copy of the input query 210, and optionally additional information such as an identification for the user initiating the search, in the query log 206. The query log 206 can comprise non-volatile storage media (e.g., a server, flash memory, a hard disk, tape, an optical disk) and/or volatile storage media (e.g., cache and random access memory). The query engine 204 conducts a search of the data collection 208 (e.g., sites and severs accessed via the Internet) based on the input query 210 and produces search results 212.

Search Query Evaluation

As mentioned above, aspects of the present invention can be used to provide spell correction or edits to input text in the form an input query to a target data collection. For instance, the target error model can be used as a query error model, which in turn is used by a search query evaluation component 220, shown in FIG. 2, that is configured to provide alternative input query suggestions to the user or the query engine 204, as will be discussed below.

Approximately 100, of the queries sent by users to web search engines are flawed by misspelling errors. Therefore, an important problem in web searching is detecting and correcting the misspelled queries.

Unlike traditional word spellers, which can propose a set of alternatives to each misspelled word, typical web query spell checkers suggest only one spelling alternative for a web query. As a result, a much higher precision is needed than that which traditional spellers provide. Traditional spell checkers employ a trusted lexicon and draw attention to out-of-lexicon words. In web queries and also in queries to a specialized dynamic data collection, such as a sport news and health news collections with daily feeds, unknown words (according to such a lexicon) may not represent spelling mistakes (e.g., limp bizkit) because the list of commonly queried terms is not fixed, but changes rapidly. Moreover, there are cases when in-lexicon words should be changed to other in-lexicon or even out-of-lexicon words, based on collocational information (e.g., food explorer → ford explorer, limp biz kit → limp bizkit). In web searching, misspelled words can be many letter-edits away from the intended word, especially when such words represent names of persons, companies, technologies, or products, to mention just a few.

Web-query spelling correction can benefit from the existence of query logs, as provided by the present invention, in addition to trusted lexicon and/or corpus data. Such query logs contain important near real-time information about word frequencies, word contexts, and about misspelling errors.

Input Query Correction

Figure 3:
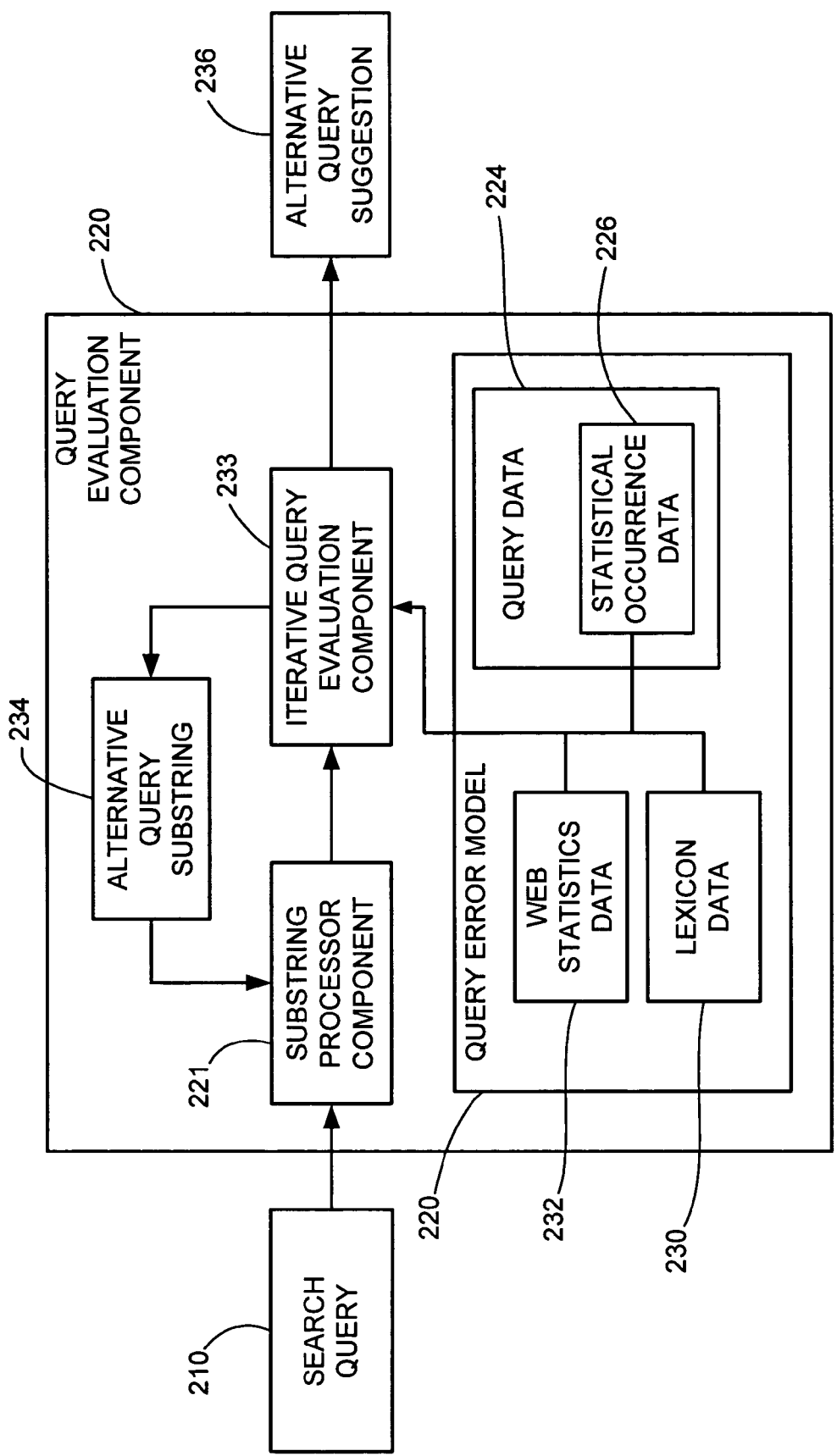
FIG. 3 is a block diagram of the source query evaluator component in accordance with embodiments of the invention.

FIG. 3 is a block diagram of the query evaluation component 220 in accordance with embodiments of the invention. The query evaluation component 220 makes suggestive corrections to the input query 210, which is preferably tokenized by a substring processor component 221, based on a query error model 222. The query error model 222 contains prior input query data 224 contained in the query log 206 for the data collection 208. In accordance with one embodiment of the invention, the query error model 222 includes statistical occurrence data 226. Additionally, the query error model 222 can include a searchable lexicon data structure 230, and web/data-collection statistics or index data 232.

The query log 206 provides information about the frequency of queries submitted by users. It may also contain information about instrumented sequences of queries submitted by users. The statistical occurrence data 226 is preferably generated by first tokenizing the input queries 210 in the query log 206 utilizing space and word-delimiter information in addition to available lexical information (for example, a lexicon entry such as "multi-modal" will not be split into three parts). The statistical occurrence data 226 includes word occurrence and co-occurrence statistics on the queries in the query log 206, such as unigram (individual words) and bigram (sequences of two consecutive words) statistics. The statistical occurrence data 226 is a valuable tool in assessing whether substrings of an input query 210 are correctly entered, due to the fact that correctly spelled input queries are substantially more frequent than misspelled input queries. The more frequent an input query is in the query log 206, the more likely it is to be correctly spelled. Thus, occurrence and co-occurrence frequencies of correctly spelled words are typically greater than frequencies of corresponding misspellings.

The statistical occurrence data 226 is then applied to the subsequently entered input queries 210 to generate the relational data 228 that maps misspelled input query substrings to corrective substring suggestions for the input query 210. There are numerous processes that can be employed to determine what the corrective substring(s) suggestion should be for a given misspelled input query substring(s). In accordance with one embodiment of the invention, an iterative query evaluation component 233 of the query evaluation component 220 performs an iterative process in which corrective substring suggestions 234 are produced and reanalyzed using the query error model 220 until a most appropriate alternative query suggestion 236 is generated. The query engine 204 can then either use the alternative query suggestion 236 in the search of the data collection 208 or provide it to the user, who then has the option of submitting it back to the query engine 204.

One example of statistical occurrence data 226 for search queries relating to Albert Einstein is provided in Table 1. The statistical occurrence data 226, which contains the frequency information for query terms, indicates that the correct spelling "albert einstein" is entered into the query log 206 more frequently than the related misspelled query term bigrams listed there below.

Once statistical occurrence data 226 has been generated, an input query 210 can be corrected by tokenizing it, matching substrings of the input query to substrings stored in 226 and finding the most likely overall spelling alternative in terms of the substring statistics stored in 226.

Before the query error model 220 becomes operable for the purpose of providing alternative corrective input query suggestions 236 for an input query 210, the statistical occurrence data 226 must be generated. The generation of the statistical occurrence data 226 requires an analysis of a large number of input queries 210 from the query log 206. Accordingly, a sufficient period of time must elapse from the time at which input queries 210 are received and logged by the data collection search system 200, before the query error model 220 is ready to facilitate input query correction.

The present invention operates to expedite the process of forming a query error model for a new data collection search system that lacks input query data, or has too few input queries in its query log, to develop the necessary statistical occurrence data by using a projection of the relational data 228 onto the new data collection.

Target Error Model Formation

The following description of the present invention will utilize the term "source" to describe components of existing data collection search systems having fully developed query logs or query logs containing a large amount of input query data. The term "target" will be used to describe a relatively new data collection system 254 that lacks a query error model and includes, at most, an underdeveloped target query log 255 that does not contain a sufficient amount of input query data to enable the formation of an error model based thereon.

Figure 4:
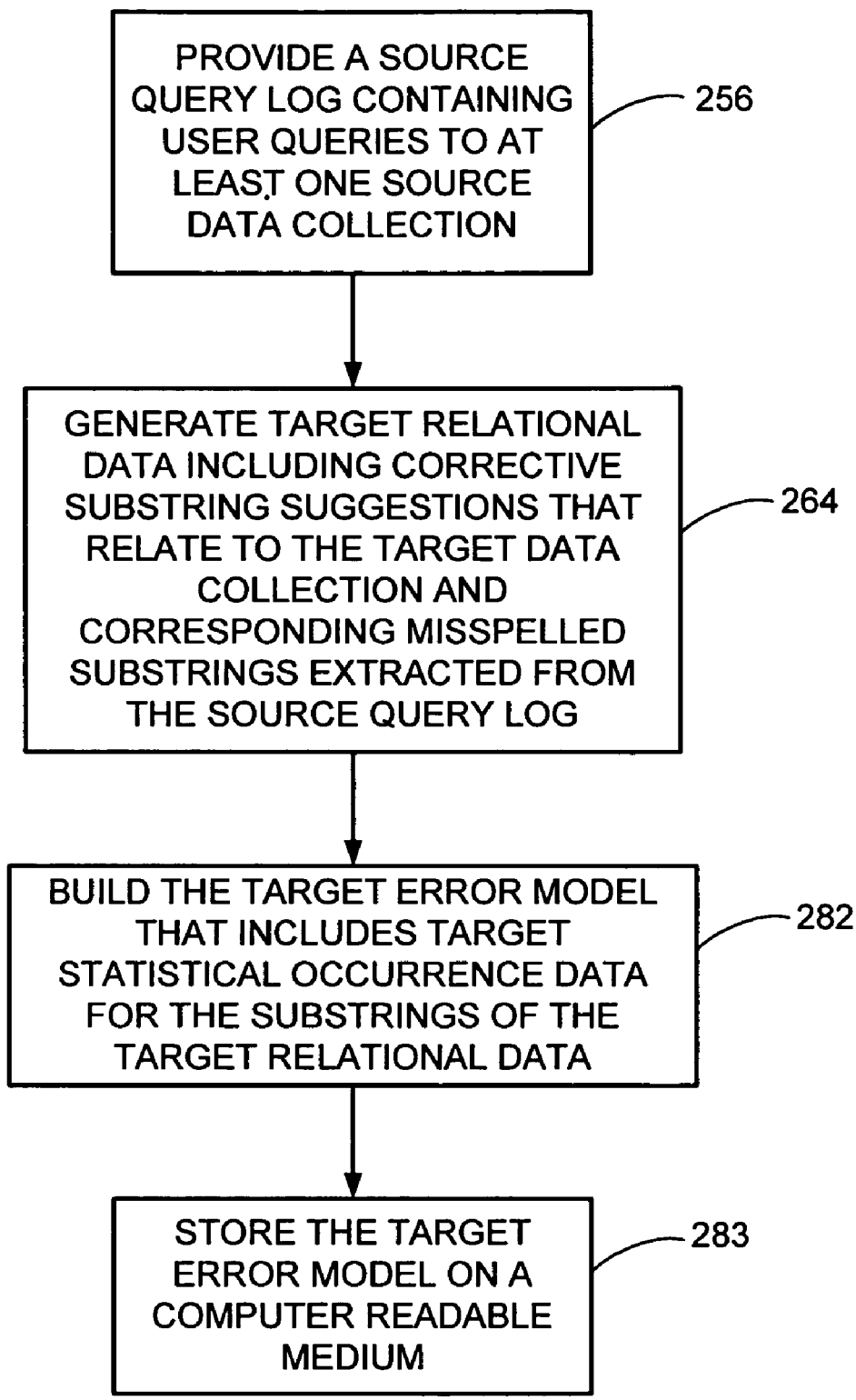
FIG. 4 is a flowchart illustrating a method of forming a target error model in accordance with embodiments of the invention.
Figure 5:
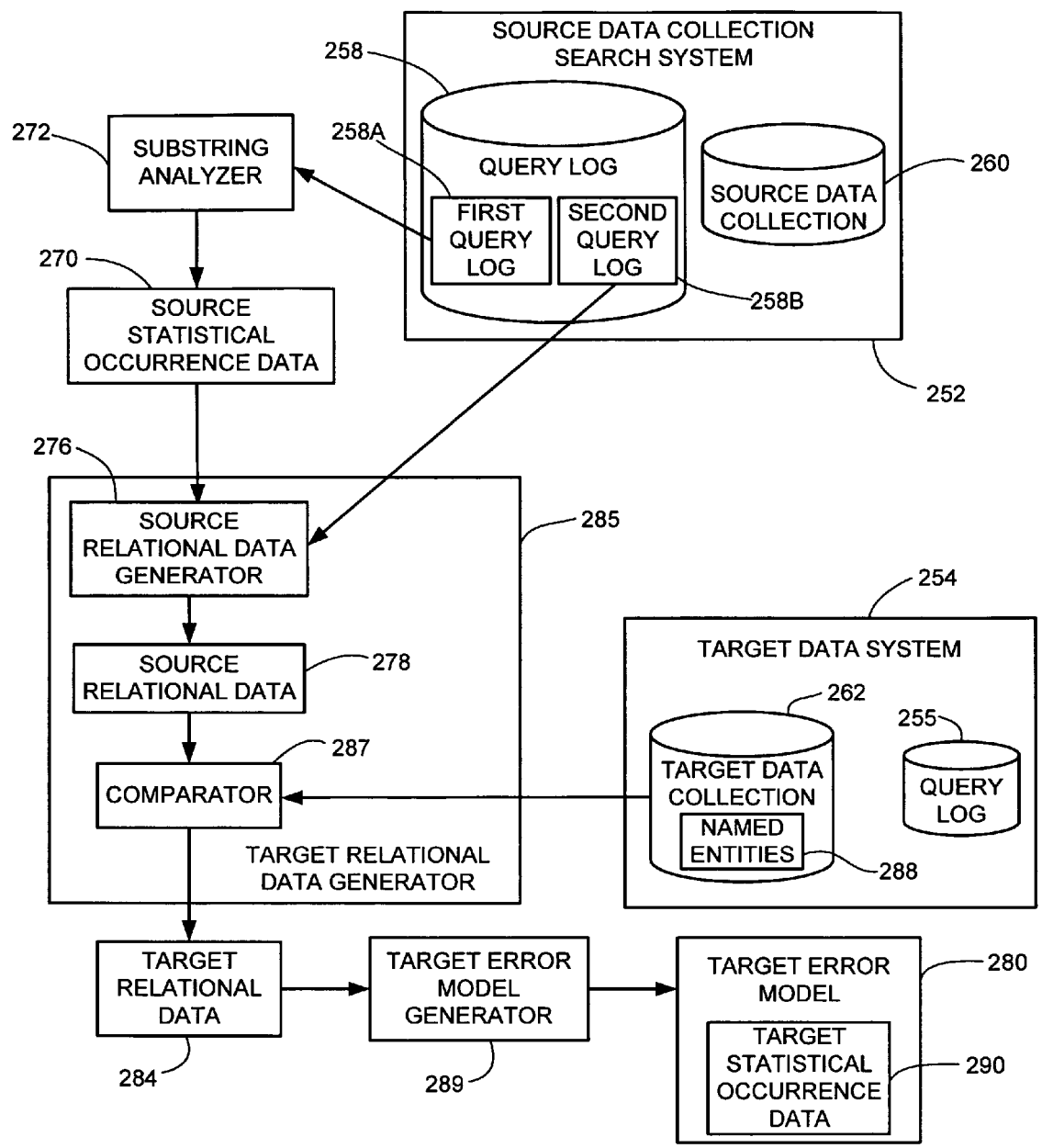
FIG. 5 is a block diagram of a system configured to implement the method of FIG. 4, in accordance with embodiments of the invention.

FIG. 4 is a flowchart illustrating a method of forming a target error model and FIG. 5 is a block diagram of a system 250 configured to implement the method, in accordance with embodiments of the invention. Elements having the same or similar numeric identifiers correspond to the same or similar elements. Additionally, some elements are not shown to simplify the drawing.

At step 256 of the method, a source query log 258 of a source data collection search system 252 is provided containing user queries to at least one source data collection 260. The source data collection 260 is preferably very general (e.g., a general web search) and includes subject matters that substantially cover the content of the target data collection 262. In other words, the input queries contained in the source query log 258 should likely include input queries that have terms that are related to the target data collection 262. Thus, when the source data collection search system 252 corresponds to a general web searching system, where users input an immense variety of queries, such input queries would overlap a target data collection 262 such as a music database.

Next, at step 264, target relational data 284 is generated that includes correct queries having correct substrings, referred to herein as corrective substring suggestions, from the source query log 258 that relate to the target data collection 262. Additionally, the relational data 284 includes misspelled substrings of the source query log 258 that are mapped to corresponding corrective substring suggestions. Table 1, is a list of exemplary relational data for a correct query or corrective substring suggestion "albert einstein" including the corresponding mapped misspelled input queries and their frequencies extracted from a source query log.

TABLE 1

Albert Einstein Queries

| Search Query | Frequency |
|---|---|
| albert einstein | 10135 |
| albert einstien | 1320 |
| albert einstine | 221 |
| albert einsten | 53 |
| albert einstein's | 52 |
| albert einsteins | 48 |
| albert einstain | 21 |
| albert einstin | 20 |
| albert eintein | 19 |
| albeart einstein | 17 |
| aolbert einstein | 11 |
| alber einstein | 8 |
| albert einseint | 7 |
| albert einsteirn | 7 |
| albert einsterin | 7 |
| albert eintien | 6 |
| alberto einstein | 6 |
| albrecht einstein | 5 |
| alvert einstein | 5 |

In accordance with one embodiment of the generating step 264, the target relational data 284 is generated based on an application of a source error model to the source data collection 260. The source error model can be configured to implement any suitable spell checking method to generate the source relational data 278.

Figure 6:
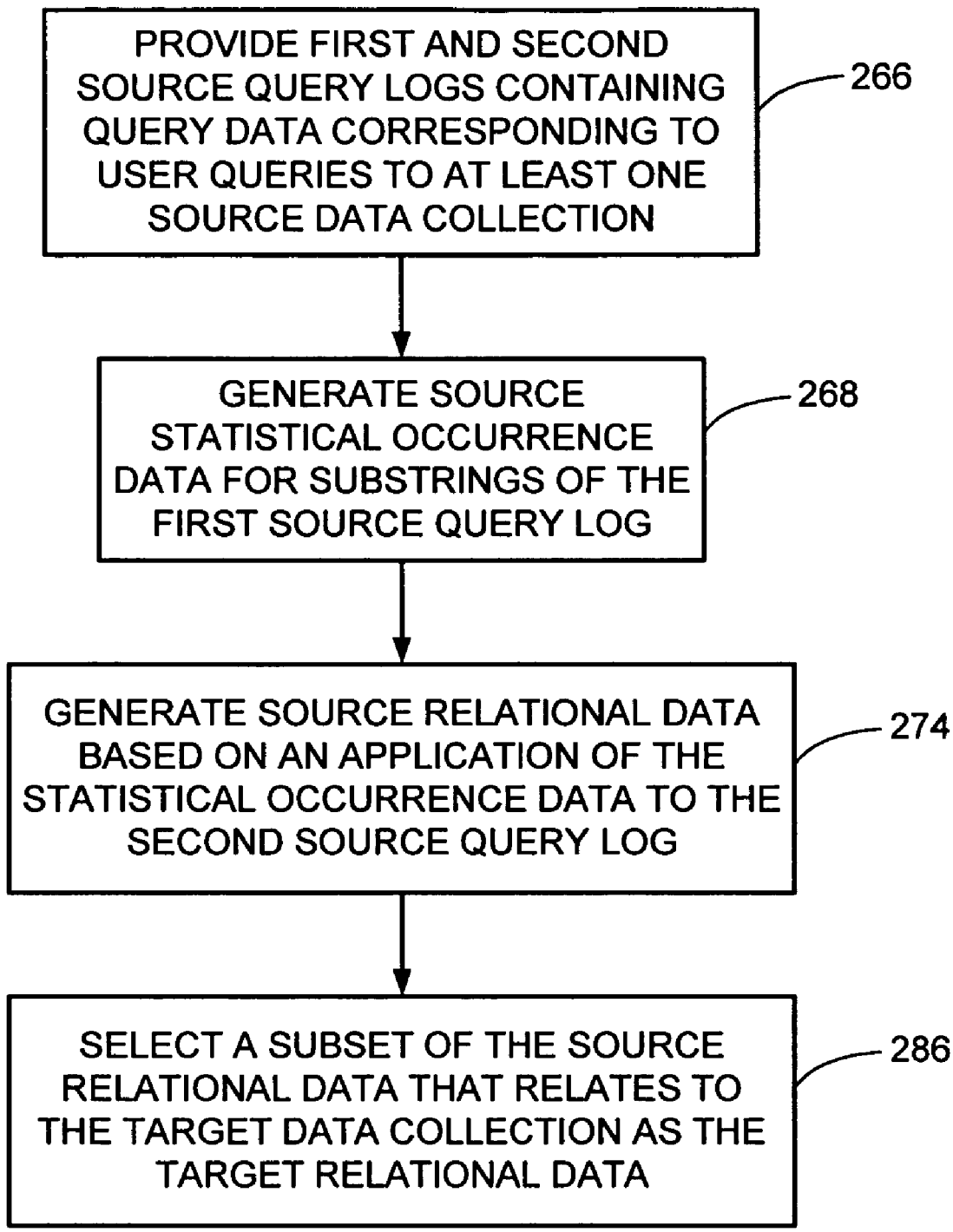
FIG. 6 is a flowchart illustrating a method of generating source relational data in accordance with embodiments of the invention.

In accordance with one embodiment of the generating step 264, the target relational data 284 is generated by a target relational data generator 285 based on an application of source statistical occurrence data 270 for input queries to the source data collection 260 to other (e.g., subsequent) input queries to the source data collection 260 or a related data collection, as illustrated in the flowchart of FIG. 6. At step 266, first and second source query logs 258A and 258B are provided each containing query data corresponding to user queries to at least one source data collection 260.

In accordance with one embodiment of the invention, the first and second source query logs 258A and 258B are parts of a single source query log 258 containing input queries to the source data collection 260, as shown in FIG. 5. As a result, one embodiment of step 264 involves dividing the source query log 258 provided in step 256 of the method of FIG. 4 into the first and second source query logs 258A and 258B. Thus, for example, the first source query log 258A may comprise input queries from the source query log 258 that were entered up to a certain date and the second source query log 258B may comprise input queries from the source query log 258 that were entered after the date.

Next, at step 268, the source statistical occurrence data 270 (FIG. 5) is generated by a substring analyzer 272 based on an analysis of the first source query log 258A. The source statistical occurrence data 270 indicates the frequency at which the first source query log 258A contains matching query terms (term unigrams and/or term bigrams) and other information, as explained above. Thus, the source statistical occurrence data 270 can include any occurrence and co-occurrence statistics (including unigram and bigram statistics) for the substrings of the queries contained in the first source query log 258A, for example.

At step 274 (FIG. 6), source relational data 278 is output based on an application of the source statistical occurrence data 270 to the second source query log 258B by a source relational data generator 276. Such an application associates or maps misspelled substrings of the queries in the second source query log 258B to corrective substring suggestions in the first source query log 258A based on the source statistical occurrence data 270 to thereby generate source relational data 278. Additionally, the source relational data 278 preferably includes the source statistical occurrence data 270 corresponding to the mapped substrings.

Finally, at step 286, a subset of the source relational data 278 that relates to the target data collection 262 is selected as the target relational data 284. In accordance with one embodiment of the invention, a comparator 287 of the target relational data generator 285 compares the corrective substring suggestions of the source relational data 278 to named entities 288 of the target data collection 262. Matches between the corrective substring suggestions of the source relational data 278 and the named entities 288 are selected as the source relational data 284 along with their corresponding misspelled substrings and output by the comparator 287. The corrective substring suggestions of the source relational data 278 that do not match one of named entities 288 of the target data collection 262 and their corresponding misspelled substrings, are not selected as target relational data 284. Thus the comparator 287 operates to filter the source relational data 284 using the named entities 288 of the target data collection. Exemplary embodiments of the named entities include names of people, names of locations, company names, product names, book titles, names of diseases, drug names, names of software processes, names of music bands, song titles, and album titles.

Referring again to the general method illustrated in FIG. 4, a target error model 280 is built at step 282, and stored on a computer readable medium, such as those discussed above, at step 283. The target error model 280 is built by a target error model generator 289 based the target relational data 284. In accordance with another embodiment of the invention, the target error model 280 includes target statistical occurrence data 290 corresponding to the source statistical occurrence data 270 for the corrective substring suggestions and their corresponding misspelled substrings contained in the target relational data 284. Thus, the target statistical occurrence data 290 is generally a subset of the source statistical occurrence data 270, as filtered by the comparator 258, based upon a comparison to the named entities 288 of the target data collection 262.

Additional embodiments of the target error model 280 include one or more lexicon data structures, such as a general language lexicon or a term thesaurus particular to the target data collection, and/or data collection statistics, such as word occurrence and co-occurrence information in the data collection.

Once the building of target error model 280 is complete, it can be immediately put to use in a the target data collection system 254 to facilitate spell checking of input text that relates to the target data collection 262. For example, the target error model can be used to spell check a document that is written about information contained in the target data collection 262. Also, when the target data collection system 254 is a search system, the target error model 280 can be used as a query error model to evaluate (i.e., spell check) input text in the form of input queries to the target data collection 262, as explained above with respect to FIGS. 2 and 3. The target error model 280 can be used for many other input text evaluation purposes for the target data collection system 254.

As a result, the delay associated with having to build an error model for a data collection search system that is based on logged query data to the data collection search system can be avoided.

Online Music Service Example

The following describes an exemplary application of the present invention, in which it is used to generate an error model (i.e., query error model) a for a music data collection (target data collection) for a new music online service that includes little, or no input query data. The music data collection 262 (FIG. 5) can include named entities 288 in the form of song names, album names, artist names and music band names. Relational data 284 for use in correcting input queries to the music data collection 262 is generated by taking a subset of source relational data 278 corresponding to an existing source query log 258 for a general source data collection 260 (the web) that is sufficiently large to overlap the music data collection 262, in accordance with the embodiments discussed above.

The source relational data 278 corresponding to mappings of misspelled input queries to non-music related subject matter are preferably filtered out by the comparator 287, based on the contents of the music data collection 262, such as the named entities 288. The resultant target relational data 284 may include corrective substring suggestions (e.g., "celine dion", "britney spears", "bruce springsteen" and "bryan adams") and corresponding commonly misspelled substrings (e.g., "celene dion", "britny spears", etc.) mapped thereto, an exemplary portion of which is provided in Table 2.

TABLE 2

Music Data Collection Relational Data

| Search Query | Frequency |
| --- | --- |
| celine dion | 16409 |
| celion dion | 750 |
| celinedion | 687 |
| celin dion | 541 |
| celine dione | 459 |
| celene dion | 278 |
| celine deion | 201 |
| . | . |
| . | . |
| . | . |
| britney spears | 54098 |
| britny spears | 3190 |
| britney spers | 2107 |
| . | . |
| . | . |
| . | . |
| bruce springsteen | 2469 |
| bruce springstein | 453 |
| bruce sprngsteen | 98 |
| bruce springsten | 34 |
| . | . |
| . | . |
| . | . |
| bryan adams | 1850 |
| brian adams | 79 |
| bryn adams | 43 |
| brain adams | 22 |
| bryan addams | 16 |

The target error model 280 for the music data collection 262 can be immediately put to use to correct the initial input queries to the music data collection by a query evaluation component using the occurrence statistics from the target relational data. As a result, delays in preparing of a query error model for the music data collection are avoided by eliminating the need to form such an error model based on collected input queries to the music data collection search system.

Although the present invention has been described with reference to particular embodiments, workers skilled in the art will recognize that changes may be made in form and detail without departing from the spirit and scope of the invention.

What is claimed is:

1. A method of forming a target error model to facilitate spell checking input text related to a target data collection comprising steps of:
    a) providing a source query log containing user queries to at least one source data collection;
    b) generating target relational data based on the source query log including corrective substring suggestions that relate to the target data collection and corresponding misspelled substrings for the corrective substring suggestions extracted from the source query log, by applying a source error model to the source query log to thereby generate source relational data including corrective substring suggestions for misspelled substrings of the source query log, and selecting a subset of the source relational data that relate to the target data collection as the target relational data;
    c) building a target error model using the target relational data including target statistical occurrence data for the substrings of the target relational data derived from the source query log; and
    d) storing the target error model on a computer readable medium.

2. The method of claim 1, wherein the target relational data includes corrective substring suggestions from the source relational data that match substrings of the target data collection.

3. The method of claim 1, wherein the generating step b) includes filtering the source relational data using named entities of the target data collection.

4. The method of claim 3, wherein the target relational data includes the corrective substring suggestions of the source relational data that match the named entities of the target data collection and their corresponding misspelled substrings.

5. The method of claim 4, wherein the named entities are selected from the group consisting of names of people, names of locations, company names, product names, book titles, names of diseases, drug names, names of software processes, names of music bands, song titles, and album titles.

6. The method of claim 1, wherein the source error model contains statistical occurrence data and is generated based on input queries to the at least one source data collection.

7. The method of claim 1, wherein the target statistical occurrence data includes at least one of occurrence statistics and co-occurrence statistics for the substrings of the target relational data.

8. The method of claim 1, wherein the building step c) includes providing a searchable lexicon data structure.

9. A method of forming a target error model to facilitate spell checking input text related to a target data collection comprising steps of:
    a) providing first and second source query logs comprising query data corresponding to user queries to at least one source data collection by dividing a primary source query log corresponding to user queries to the source data collection into the first and second source query logs;
    b) generating source statistical occurrence data for substrings of the first source query log;
    c) generating source relational data including corrective substring suggestions for misspelled substrings of the second source query log based on an application of the statistical occurrence data to the second source query log;
    d) selecting a subset of the corrective substring suggestions and their corresponding misspelled substrings of the source relational data that relate to substrings of the target data collection as target relational data;

e) building a target error model using the target relational data including target statistical occurrence data for the substrings of the target relational data; and f) storing the target error model on a computer readable medium.

10. The method of claim 9, wherein the building step e) includes counting at least one of occurrences and co-occurrences of substrings in the target relational data to build the target statistical occurrence data.

11. The method of claim 9, wherein the target statistical occurrence data includes at least one of unigram statistics and bigram statistics for the substrings of the target relational data.

12. The method of claim 9, wherein the generating step d) includes filtering the source relational data using named entities of the target data collection.

13. The method of claim 12, wherein the target relational data includes the corrective substring suggestions that match the named entities of the target data collection and their corresponding misspelled substrings.

14. The method of claim 9, wherein the building step e) includes providing a searchable lexicon data structure.

15. A system for forming a target error model to facilitate spell checking input text related to a target data collection comprising:

a source query log comprising query data to at least one source data collection;

a target relational data generator having an output of target relational data including corrective substring suggestions that relate to the target data collection and corresponding misspelled substrings for the corrective substring suggestions extracted from the source query log;

a target error model generator including an output of target statistical occurrence data including at least one of unigram statistics and bigram statistics for the substrings of the target relational data;

a computer storage medium containing a target error model comprising the target statistical occurrence data; and a computer processor being a functional component of the system and facilitating generating the output of the target relational data generator and the target error model generator.

16. The system of claim 15 including a substring analyzer configured to generate source statistical occurrence data including at least one of unigram statistics and bigram statistics of queries to the at least one source data collection, wherein the target relational data is generated based on an application of the source statistical occurrence data to the source query log.

17. The system of claim 16, wherein the target relational data generator includes a source relational data generator configured to apply the source statistical occurrence data to the source query log to thereby generate source relational data including corrective substring suggestions for corresponding misspelled substrings of the source query log, wherein the target relational data comprises a subset of the source relational data.

18. The system of claim 17, wherein the target relational data generator includes a comparator including an output of the target relational data that includes the corrective substring suggestions that match named entities of the target data collection and their corresponding misspelled substrings.

* * * * *